March 15, 1966  J. M. TYRNER  3,239,886
APPARATUS FOR ULTRA HIGH PRESSURES
Filed Dec. 24, 1964  3 Sheets-Sheet 1
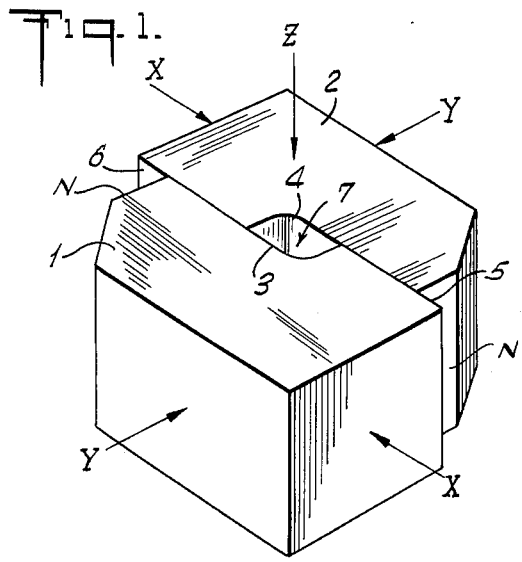
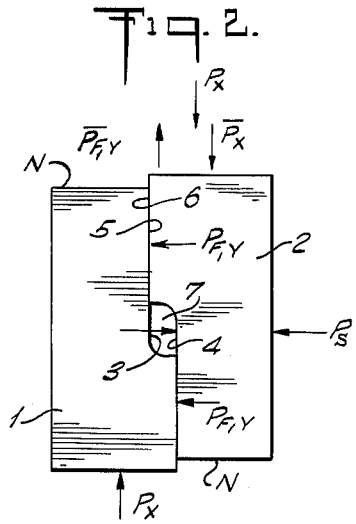
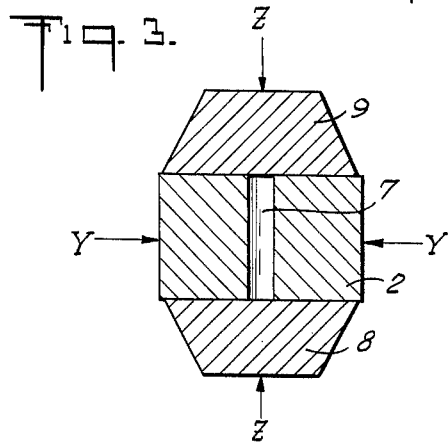
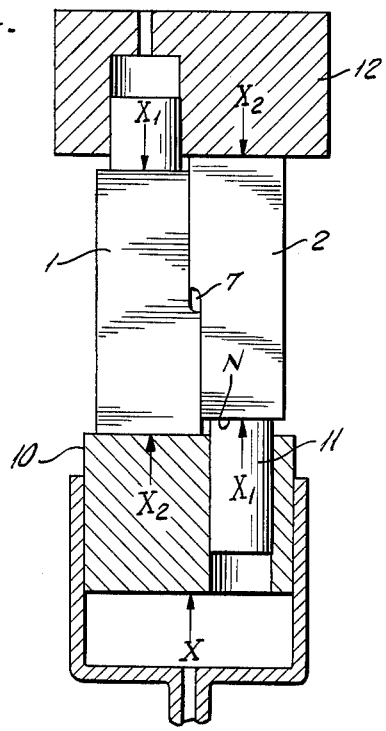
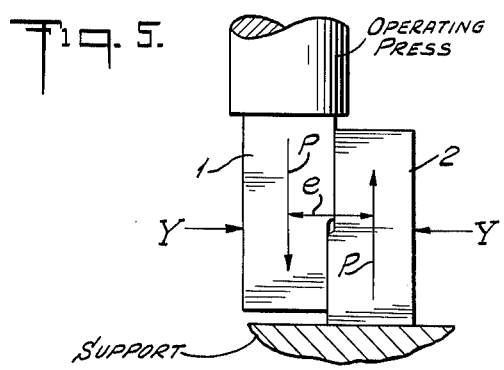
INVENTOR
JOSEPH M. TYRNER
BY
ATTORNEY March 15, 1966  J. M. TYRNER  3,239,886
APPARATUS FOR ULTRA HIGH PRESSURES
Filed Dec. 24, 1964  3 Sheets-Sheet 2
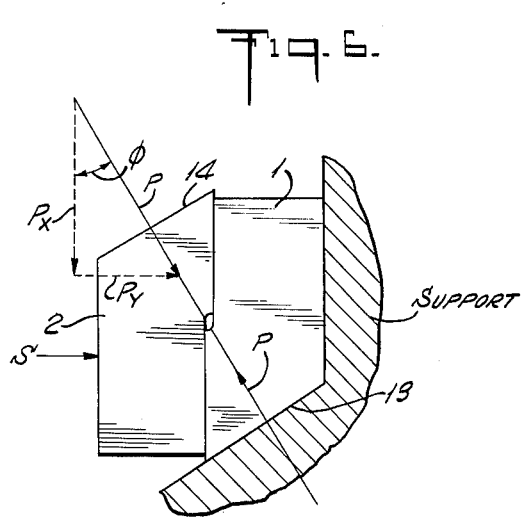
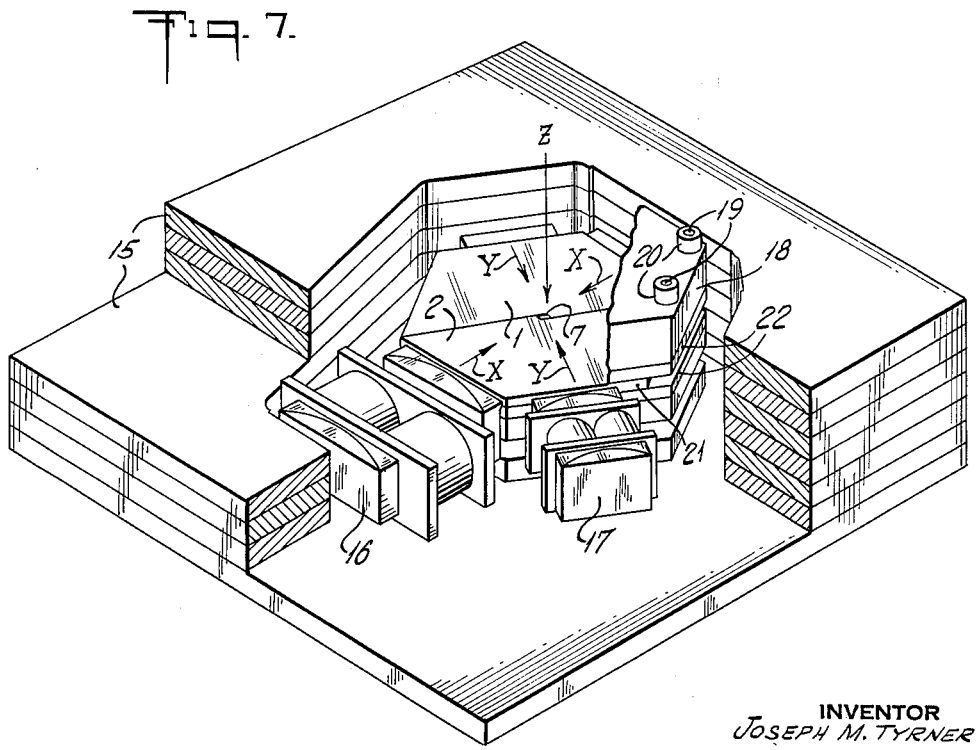
INVENTOR
JOSEPH M. TYRNER
BY
ATTORNEY March 15, 1966  J. M. TYRNER  3,239,886
APPARATUS FOR ULTRA HIGH PRESSURES
Filed Dec. 24, 1964  3 Sheets-Sheet 3

INVENTOR
JOSEPH M. TYRNER
BY
ATTORNEY

United States Patent Office 3,239,886
Patented Mar. 15, 1966

---

3,239,886
APPARATUS FOR ULTRA HIGH PRESSURES
Joseph M. Tyrner, Brookside, N.J., assignor to Allied Chemical Corporation, New York, N.Y., a corporation of New York
Filed Dec. 24, 1964, Ser. No. 420,940
12 Claims. (Cl. 18—16)

This invention relates to an apparatus for producing ultra high pressures. More particularly, the invention pertains to such apparatus which is eminently capable of applying higher pressures to a greater variety of sizes and shapes of objects, in a more efficient way than has heretofore been obtainable.

Ultra high pressure technology is playing an increasingly large role in research studies for the preparation of new and valuable articles. It has been found that ultra high pressures induce phase changes which effect various physical and chemical changes which often give added desirable characteristics to a variety of known materials. Ultra high pressure has also been used to prepare synthetic diamonds by the transformation of carbonaceous materials, to make dense refractory metal carbides and to catalyze a variety of chemical reactions.

Ordinary methods for producing high pressures, conventionally employ simple hydraulically operated pistons which advance within a cylinder compressing the substance enclosed. Limits for the compressive strength obtainable by this means are quickly reached and depend on strength of materials used and stresses developed in the cylinder and piston. Under normal conditions, pressure limits are well below 50,000 p.s.i. Only a limited increase in maximum pressures obtainable can be achieved by increasing the thickness of the cylinder wall, since only the inner layer of a thick-wall cylinder in proximity to the I.D. is fully used from the viewpoint of stress. An infinitely thick cylinder will not allow fluid pressures in excess of 0.58 of the permissable tensile stress of the metal and therefore it is useless to make the O.D. of a thick-wall cylinder greater than three or four times the I.D. The capacities of such thick-walled cylinders are in the range of about 80,000–125,000 p.s.i. More sophisticated modifications of the basic piston-cylinder means includes the use of compound cylinders, which make 150,000–225,000 p.s.i. obtainable. The use of stronger materials, such as alloy steels and tungsten carbide, in particular, are reported to permit upwards of 500,000 p.s.i. (35 kilobars).

The usual methods for generating ultra high pressure are based on two interrelated principles suggested by Percy W. Bridgman: (1) the "Massive Support" principle and (2) the use of pressure transmitting materials which become viscous under high pressure.

Bridgman suggested limiting the extreme stress to a small face area (rams or anvils) from which the specimen material quickly spreads sideways. The elements of material stressed in the immediate vicinity of the specimen are supported by larger elements which are subjected to a lesser stress because of their increased size. A ram or anvil of this type cannot be used as a piston in a cylinder-piston system because of the conical geometric shape of the ram, which cannot move as a piston on the surface of a cylinder. As the cavity enlarges in this system, the cylinder is replaced by an extensible gasket which is deformed and becomes viscous under pressure. An extruded gasket is formed which exercises a restraining force which assists in counteracting the bursting forces which are generated tangentially to the anvil surface. It is generally recognized that pressures up to 3,750,000 p.s.i. (250 kilobars) can be generated with this device. The specimen size, however, is severely limited with this type of apparatus; thickness is usually about 0.010 inch, and diameter ordinarily does not exceed ⅛ inch. These limitations generally prevent the use of such apparatus for applied engineering investigations.

A number of other schemes have been developed for making use of the ram device with massive support all of which, however, require use of an extrudable filler. For example, cylinder-piston systems in which the piston is pushed by a massive support ram have been devised wherein that portion of the piston outside of the cylinder is supported by yielding material which gives it support and at the same time permits a stroke of the ram. Modifications of this apparatus permit practical pressures of 1,500,000 p.s.i., which magnitude of pressure unfortunately cannot be applied uniformly to the specimen. Furthermore, although in this type of system the piston inside the system may be considered as supported; the piston only receives "passive support." The piston must increase its diameter in order to press against the wall circumferentially. This pressure against the wall increases the diameter of the cylinder bore, which increased diameter must be compensated by a corresponding additional increase in piston diameter. Since in ultra high pressure systems, material is stressed beyond its elastic limit, upon the release of the pressure, cylinder and piston do not return to their original dimensions, but remain distorted and do not readily disengage. As a consequence, such systems frequently fail in the disengaging period of the cycle.

The so-called "belt" and "girdle" designs in essential operation, replace the cylinder with a ring and the piston with a ram, both of which are designed for massive support. As in the above discussed devices, the resulting geometrical configuration cannot enclose a reducible cavity. A space between the ram and belt is always left, which changes shape and volume as the ram closes in on the specimen. Thus, as in the other devices, it is necessary to fill this space with a yielding, extrudable material.

The tetrahedral anvil apparatus of H. T. Hall is another device designed to make use of the massive support principle and consists essentially of four massive support rams closing in from the corners of a tetrahedron. By this means, use of a confining cylinder is completely eliminated. Pressures in the range of 100 kilobars can be developed by this apparatus. Such apparatus, however, must of necessity be relatively large and, as in the case of other high pressure devices, described above, is incapable of forming a cavity diminishing in size. Again, extrudable material is required to complete the cavity.

The use of extrudable material presents a serious disadvantage. Since the resistance of the material against extrusion replaces a rigid wall, its cross section must be kept small or there will not be enough flow resistance to restrain the specimen. A small cross section, in turn, leads to a short stroke and small cavities. Consequently, all systems which depend on extrudable materials for completion of the cavity enclosure are limited to relatively small cavities.

Although a number of modifications of the above described apparatuses have been made which represent improvements in many respects, they all suffer from a number of other disadvantages in addition to the significant one of requiring extrudable material. In general, the modifications have resulted in more complicated and heavier equipment which, in turn, results in greater costs in construction, installation, operation and maintenance.

Accordingly, a primary object of the instant invention is to provide an improved apparatus for developing ultra high pressure which affords a specimen cavity diminishing in size and not requiring the use of extrudable material.

Another object of the invention is to provide an apparatus for the generation of potentially higher pressures than those yet obtainable, which pressures can be sustained for longer periods of time than has heretofore been possible.

It is another object of the invention to provide an ultra high pressure apparatus permitting the use of larger cavities and consequent application of pressure to larger specimen sizes.

It is still another object of the invention to provide a high pressure apparatus which is capable of developing ultra high pressures which can be released gradually without resulting failure and loss of equipment.

It is yet another object of the invention to provide such high pressure aparatus which is cheaper, simpler, smaller in size and more efficient than those known in the art.

It is a further object of the invention to provide a high pressure apparatus with the above described advantages which has a longer life and which permits disassembly after use without destruction of the equipment.

Other objects and advantages of the invention will become apparent from the following description.

The invention can be more readily understood when the forthcoming description is taken in conjunction with the accompanying drawings in which:

FIG. 1 is a perspective view of illustrative mounted sliding members (with closure blocks removed), which are employed in the general practice of the invention.

FIG. 2 is a front elevation of the slide wall cavity formed by the sliding members of FIG. 1 schematically showing frictional and force vectors.

FIG. 3 is a cross-sectional end view, taken through the slide wall cavity showing the mounted closure blocks.

FIG. 4 is a front elevation, partially in section, taken longitudinally along the front surface of the mounted sliding members, showing the relationship between pressure applying means and fixed supporting members, according to one embodiment of the invention.

FIG. 5 is a front elevation, without closure blocks, showing schematically the eccentricity moments developed in an embodiment such as of FIG. 2.

FIG. 6 is a front elevation of another and preferred embodiment of the invention, schematically showing vector forces developed.

FIG. 7 is a perspective view, partially in section, illustrating the preferred embodiment of the invention.

Figure 8:
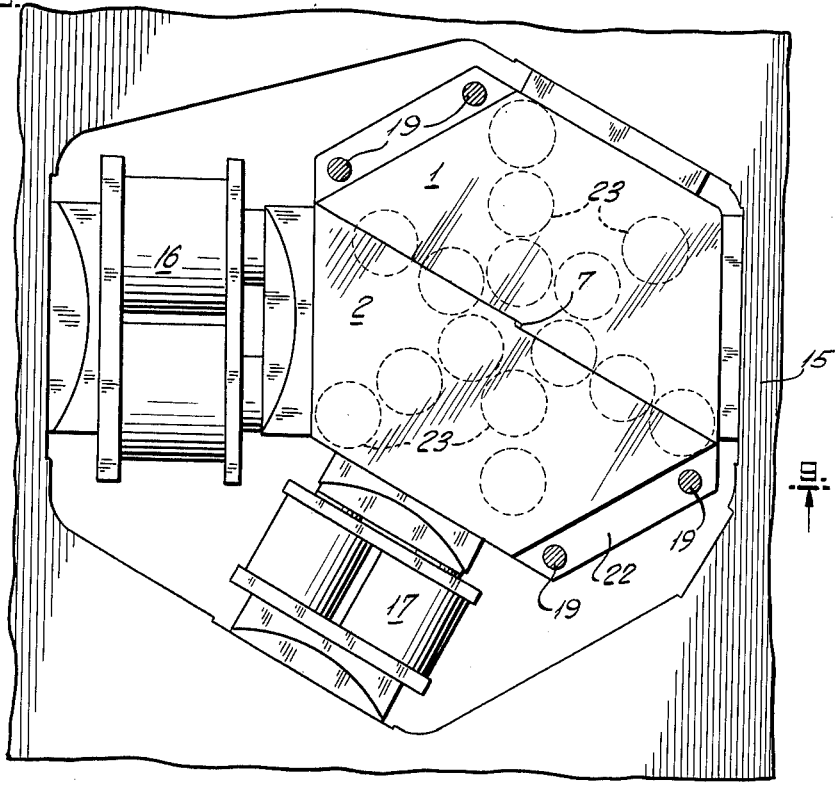
FIG. 8 is a plan view on the broken lines 8—8 of FIG. 9.

The objects of the invention are accomplished, in principle, by providing a sliding wall cavity which is formed by two stepped sliding block members as shown in FIG 1. As can be seen in this figure, the volume of the cavity changes as the two block members slide in the X direction. On top and bottom the cavity is closed by two stationary members which do not interfere with the sliding motion of the slide members. The resulting geometric configuration thus encloses a reducible cavity and no space exists which must be filled with extrudable material. The four members surrounding the cavity are held together by forces applied in the three directions X, Y and Z, which directions are shown in FIG. 1. The force exerted in the X direction is the force which performs the work of compressing the sample in the cavity. The forces exerted in the other two directions, Y and Z, serve merely to hold the system together. The advantages in simplicity of construction and operation of this system can readily be seen when it is considered, as noted above, that no extrudable material is required and when it is compared with the system of the tetrahedral anvil, for example, where all four pistons must move in unison to compress the sample evenly. According to the subject invention, the Y and Z forces may be exerted by hydraulic cylinders with very short strokes, which cylinders do not move in the direction of the force exerted, during compression. Only the cylinder effecting compressing force (in the X direction) is controlled and it is this cylinder which moves and does the work.

More particularly, with reference to FIGS. 1 and 2, there is illustrated a pair of sliding members 1 and 2, each having a continuous longitudinal recess 3 and 4 extending across the entirety of the width (see FIG. 2) and along a portion of the length, the surface of said recess being parallel to the faces 5 and 6 of the resulting raised portion of the members. As can be seen from FIG. 1, the sliding members are juxtapositionally mounted so that raised portion 5 and 6 of each contacts and slides longitudinally in the recessed portion 3 and 4 of the other, thus forming a cavity 7, the size of which varies with the relative position of the said members. A pair of oppositely positioned supporting members 8 and 9 are mounted in complementary relationship to and in contact with the sliding members 3 and 4 in such a manner so as not to interfere with the sliding motion of said members and so as to form an expansible enclosure or cavity 7, each of the sliding and supporting members (1, 2, 8 and 9) defining a wall of said enclosure. Means are provided for applying compressing force to the sliding members in the X direction and supporting force to these members in the Y direction. It is obvious that the compressing force need only be applied, in the X direction, to one face of one of the sliding members as the corresponding face of the opposing member may be secured to a fixed supporting surface. Means are also provided for exerting supporting force to closure blocks 8 and 9 in the Z direction. It can thus be seen that all the members around the cavity have either massive support or direct action support from an abutting piece, amounting to total active support on all surfaces. This is to be contrasted with the devices of the prior art benefiting only from partial massive support or from passive support on a portion of the surfaces of the sample cavity. In all parts of the slide wall cavity, compressive stresses are present. Hence, no residual distortion can result as occurs with systems benefiting merely from passive support such as the cylinder-piston system. Failures during disengagement caused by residual distoration are thus avoided.

According to a preferred embodiment, the innermost extremity of the longitudinally recessed portion terminates upwardly in the raised portion in such a configuration as to avoid stress concentration. This configuration will conveniently and most efficiently be curved or arcuate as shown in FIGS. 1 and 2, but may be designed to accomplish the same end in a variety of other ways without changing the mode of the present invention.

It is also preferred that the innermost extremity of the longitudinally recessed portion be terminally shaped laterally, so as to avoid stress concentration. The most advantageous configuration to accomplish this end will of course be a rectangular shaped step across the face of the recess perpendicular to the faces of the sliding blocks 1 and 2, as can be seen from FIGS. 1 and 2. A number of other designs can, of course, be selected to achieve the same end without departing from the spirit of the invention.

Referring now to FIG. 2, it can be seen that the weakest points in the basic system, as illustrated by FIG. 1, are the surfaces marked N. These surfaces do not receive any active support from the outside. Accordingly, another embodiment of the invention consists of providing active supporting means for these areas as shown in FIG. 4. Main piston 10 supplies the operating force $X_2$ and is equipped with a secondary auxiliary piston 11 which bears against the unsupported side N, with supporting force $X_1$. The net operating force becomes X or $X_2-X_1$. In this arrangement $X_2$ is always proportional to $X_1$, and the ratio of the support of $N$, is maintained automatically throughout the operation of the system. The oil-pressure used to operate main piston 10 may also be connected by separate line and used to apply compressing force to the other end of member 1 as shown in FIG. 4. In this embodiment, the corresponding end of member 2 is mounted against a fixed support 12.

In the sliding cavity devices described so far, the operating forces in the X direction act eccentrically on the two cavity sliding members. This is shown schematically in FIG. 5 wherein e represents the eccentricity (or distance between the axis of the compressing forces). This eccentricity results in a moment of forces, exerting its influence in a counterclockwise direction, tending to separate the sliding members and accordingly must be compensated for in some manner, such as by increasing the supporting forces in the Y direction. The result is that practical design of such a system becomes more difficult and awkward.

In a preferred embodiment of the invention, this moment of forces is counteracted in the structure embracing the cavity. Making reference to FIG. 6, the undesirable moment can be avoided by having the operating force P act under an angle phi ($\phi$) against the X direction. This is effected structurally by chamfering off ends 13 and 14 of members 1 and 2, respectively at the desired angle. The operating members can then be rearranged so that the resulting forces intersect the cavity. The new arrangement is schematically shown in FIG. 6. The optimum value for the angle phi is dependent upon such factors as magnitude of compressing force, size of cavity, shape of sliding members and magnitude of eccentricity in the system. All of these factors, as well as magnitudes of supporting forces are interrelated. Accordingly, design of an apparatus appropriate to achieve a given result will be dependent upon these desiderata.

The following discussion will serve to point out the interrelationship of these factors from the standpoint of design. Basically, the magnitude of potential pressure on a given sample, is inversely proportional to the size of the sample cavity. By way of further explanation, referring again to FIG. 6, as defined heretofore, the X direction is the direction in which the cavity is compressed. The Y direction is the direction in which the two cavity halves are held together and the Z direction is perpendicular to the XY plane. Subletters $x$, $y$, and $z$ shall denote components of forces in the X, Y and Z directions, respectively, and cavity areas perpendicular to the X, Y and Z directions, respectively. The operating force, that is the force which produces compression in the cavity, is P. Thus:

$P_x$—produces compression in the X direction,
$P_y$—contributes to the holding force in the Y direction.

H is the holding force (in the Y direction denoted as $H_y$).

The angle between X and P is phi ($\phi$). S is the force in the Y direction which, together with $P_y$, holds the cavity halves together.

The pressure in the cavity is denoted as $p$. It is assumed that it is a scalar having the directionless character of a hydraulic pressure.

The projections of the cavity in the directions X Y and Z are $A_x$, $A_y$, and $A_z$, respectively. Therefore, the forces exerted from the compressed cavity content become $A_xp$, $A_yp$ and $A_zp$. The "holding forces" must be larger than the forces exerted by the pressure contained in the cavity in order to keep the system together. The excess force necessary to maintain this differential will be designated gamma ($\gamma$) which excess can conveniently be in the order of 10%. Thus:

$$H_y = A_y p (1+\gamma) \quad (1)$$

Consequently, the excess force becomes $$\gamma A_y p$$

$f$ is the coefficient of friction between surfaces sliding on each other. The ratio between the areas $A_x$ and $A_y$ is alpha ($\alpha$) and therefore, $$A_y = \alpha A_x \quad (2)$$

$$P_x = P \cos y \quad (3)$$

$$P_y = P \sin y \quad (4)$$

The holding forces in the Y direction $A_y$ is:

$$H_y = S + P_y = A_y p (1+2) = A_x p \alpha (1+\gamma) \quad (5)$$

The operating force in the X direction becomes $$P \cos y = A_x p + F H_y \quad (6)$$

For illustrative purposes, in a practical design, the following values for alpha, gamma and $f$ may be used:

$$\alpha = 1 \quad \gamma = .1 \quad f = .01 \quad (7)$$

If we substitute the expression for $H_y$ from Equation (5) into Equation (6) and then substitute the three values given in (7), we obtain:

$$P \cos y = A_x p (1+.011)$$

Obviously, the second part may be neglected and we may set:

$$P \cos y = A_x p \quad (8)$$

The holding force S, in the Y direction, is important. From Equation (5) we derive:

$$S = \alpha A_x p (1+\gamma) - P_y \quad (9)$$

This may be transformed using equations (4) and (8) as:

$$S = \alpha P \cos y \ (1+\gamma) - P \sin y$$
$$= P(\alpha \cos y)(1+\gamma) = \sin y \quad (10)$$

If the angle phi is given the value of 30°:

$$\cos 30° = .87$$
$$\sin 30° = .50 \quad (11)$$

Inserting these values into Equation (10), we find that:

$$S = .46P$$

and $$P = 1.15 A_x p \quad (12)$$

The angle phi can be assigned a broad range of values from about 0° to about 45° but can most advantageously be varied from 30° to 45°. The ends of the sliding members will be chamfered accordingly. For design purposes, all the ends may be chamfered, although not all will be subjected to compressing or supporting forces.

The sliding wall cavity uses surfaces sliding on each other under pressure. The resulting friction forces, however, cause no reason for concern. Surfaces where parts touch each other, nonetheless, must have good surface texture to minimize friction. A suitable surface texture, for example, is one with about four microinches AA. The addition to the closing force caused by friction should not exceed about 1%. This increase of the closing force should compare favorably with the increase caused by extrusion of yielding filler material necessary in other ultra high pressure devices and is not a significant factor in the design of the apparatus.

Construction of the apparatus according to the invention, is relatively simple. Since all members around the sample cavity have either massive support or direct action support from an abutting piece, these members are stressed in compression only. This affords a distinct advantage in selection of materials since, as a rule, materials which can take the highest compressive stress do not have good tolerance to tensional stress. Suitable materials for construction purposes include steel and particularly strong sintered materials or alloys such as tungsten carbide. Machining of parts is simple and no fitting is required. Consequently disassembly is easy and cannot cause destruction of the apparatus, as happens in cylinder-piston systems, which often fail when the piston is removed.

The above described apparatus is capable of generating pressure upwards of 3,000,000 p.s.i. (200 kilobars) and of maintaining such pressures over long periods of time. Time is not a limiting factor as it is in many of the prior art devices. Pressures can readily be applied or released at any rate over any period of time without adversely affecting the equipment.

A relatively small device of the kind described herein according to the embodiment, as illustrated in FIG. 6, capable of developing 130 kilobars, may be designed with a slide wall cavity of 3/16" x 3/16" x 3/4". Four 20-ton hydraulic cylinders may be used to exert the compressing force and ten 4-ton hydraulic cylinders may be distributed and mounted within the device itself and provided with an outside pump for 10,000 p.s.i. oil pressure, to effect the supporting and holding forces. In such an apparatus sliding members of a hexagonal configuration are particularly advantageous, which hexagonal end may be 16.5" across its shortest diameter and 21" across its longest diameter. The member is 3/4" in depth and has edges chamfered at 45° from a point about 2/3 the distance to the outer edge. The stepped recesses are carved to a depth of 3/16" across the face, perpendicular to the sliding surfaces of the members and to the longitudinal axis of the sliding members, and are terminated arcuately to the raised portion of said members.

Materials used are steel, AISI 8285, GR–C, heat-treated to Rockwell RC–40. The pressure-transmitting inner surfaces of the recessed portions of the sliding members are of tungsten carbide (K96–Carbide) which contains 6% cobalt.

A larger device according to the preferred embodiment of the invention, capable of generating pressures in the neighborhood of 200 kilobars, is illustrated in FIG. 7. The device is a self-contained unit and the members are similar in shape and size to those in the 130 kilobar unit described above, except that the slide wall cavity is 5 mm. x 5 mm. x 20 mm. (equal to 0.5 cm.$^3$). For this cavity:

$$A_x = A_y = 5 \times 20 = 100 \text{ mm.}^2 = 1 \text{ cm.}^2.$$
$$A_z = 5 \times 5 = 25 \text{ mm.}^2.$$

Figure 9:
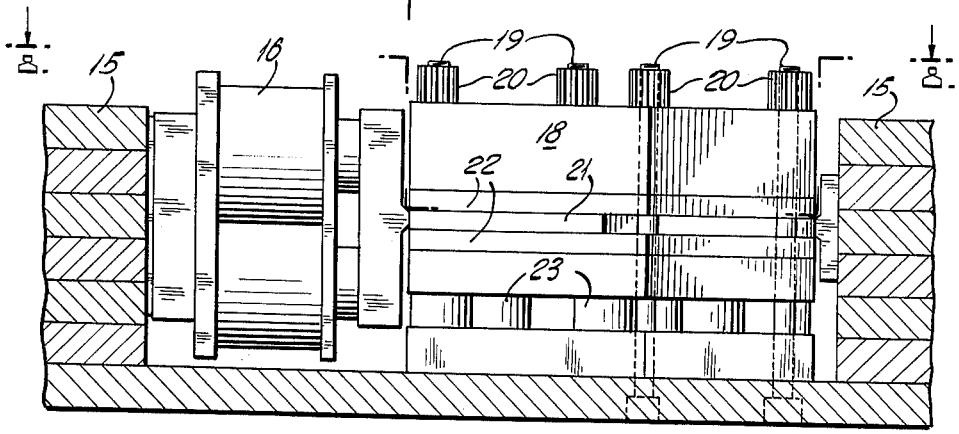
FIG. 9 is a section on the lines 9—9 of FIG. 8, with parts in elevation.

In this embodiment, the XY plane is horizontally orientated, which arrangement affords best access to the cavity for charging purposes. Referring to FIG. 7, a stack of heavy steel plates 15, or other suitable material, is provided to back up the X and Y cylinders, 16 and 17, respectively, which operate as hereinbefore described but with a force in the X direction of 270 tons and a force in the Y direction of 120 tons. The angle $\phi$ (phi) between the attack line of the X cylinder and the X direction is 30°. Cavity plates 21 of similar construction as described above, are disposed in the center of a sandwich with cover plates 22 and back up plates 18 on each side. Z pressure, of 60 tons, is provided by a series of hydraulic cylinders 23, as shown in FIGS. 8 and 9, which pull the back up plates 18 together. These cylinders are located under the lower back up plate 18 and pull on the upper back up plate 18 by means of tie rods 19. If the nuts 20 on the tie rods are removed, the upper covering over the cavity 7 may be lifted and the cavity exposed for charging.

While I have described preferred embodiments of the apparatus of the present invention, it will be understood that various modifications may be made in the design of the apparatus without departing from the spirit of the invention. By way of illustration but not in limitation of the scope of the invention, the sliding members may be of rectangular configuration, the recessed portion may be elliptical or any other configuration which avoids stress concentration. Moreover, the compressing and supporting forces may be applied over a wide range of angles and magnitudes, depending upon particular design requirements.

I claim:
1. An apparatus for applying ultra high pressure to an object comprising in combination:
   (a) a pair of sliding members each having a continuous longitudinal recess extending across the entirety of the width and along a portion of the length, the surface of said recess being parallel to the face of the resulting raised portion of the member,
   (b) the sliding members being juxtapositionally mounted so that the raised portion of each contacts and slides longitudinally in the recessed portion of the other thus forming a cavity the size of which varies with the relative position of the said members,
   (c) a pair of oppositely positioned supporting members mounted in complementary relationship to and in contact with the sliding members in such a manner so as not to interfere with the sliding motion of said members and so as to form an expansible enclosure, each of said sliding and supporting members defining a wall of said enclosure,
   (d) means for applying pressure to said sliding and supporting members.
2. The apparatus as defined in claim 1 wherein the innermost extremity of the longitudinally recessed portion terminates upwardly in the raised portion in such a configuration as to avoid stress concentration.
3. The apparatus as defined in claim 2 in which the sliding members are of a hexagonal configuration.
4. The apparatus as defined in claim 2 wherein the innermost extremity of the longitudinally recessed portion is laterally shaped so as to avoid stress concentration.
5. The apparatus as defined in claim 4 in which the ends of the sliding members are chamfered.
6. The apparatus as defined in claim 4 in which the outermost chamfered surface of one end of one sliding member as well as the outermost longitudinal surface contiguous therewith are each in juxtapositional contact with fixed supporting members.
7. The apparatus as defined in claim 6 in which the sliding members are of a hexagonal configuration.
8. An apparatus for applying ultra high pressure of an object comprising in combination:
   (a) a pair of sliding members each having a continuous longitudinal recess extending across the entirety of the width and along a portion of the length, the surface of said recess being parallel to the face of the resulting raised portion of the member,
   (b) the sliding members being juxtapositionally mounted so that the raised portion of each contacts and slides longitudinally in the recessed portion of the other thus forming a cavity the size of which varies with the relative position of the said members,
   (c) a pair of oppositely positioned supporting members mounted in complementary relationship to and in contact with the sliding members in such a manner so as not to interfere with the sliding motion of said members and so as to form an expansible enclosure, each of said sliding of supporting members defining a wall of siad enclosure,
   (d) a fixed support to which the raised portion end of one of the sliding members contacts,
   (e) means to provide pressure on the recessed end portion of the opposed sliding member,
   (f) means to provide a compressing force to the raised end portion of the sliding member referred to in (e),
   (g) means to provide auxiliary force to the recessed end portion of the sliding member referred to in (d),
   (h) means for providing supporting force to the supporting members recited in (c).
9. The apparatus as defined in claim 8 wherein the innermost extremity of the longitudinal portion terminates upwardly in the raised portion in such a configuration as to avoid stress concentration.

10. The apparatus as defined in claim 8 wherein the innermost extremity of the longitudinal portion is laterally shaped so as to avoid stress concentration.

11. The apparatus as defined in claim 8 in which the sliding members are of the hexagonal configuration.

12. An apparatus for applying ultra high pressure to an object comprising in combination:
   (a) a pair of hexagonal rectangular parallelepiped sliding members each having a continuous longitudinal recess extending across the entirety of the width and along a portion of the length, the surface of said recess being parallel to the face of the resulting raised portion of the member,
   (b) said sliding members having their innermost extremities of the longitudinally recessed portions terminating upwardly in the raised portions in such a configuration as to avoid stress concentration,
   (c) said sliding members further having their innermost extremities of the longitudinally recessed portions shaped laterally so as to avoid stress concentration,
   (d) said sliding members having chamfered ends,
   (e) the sliding members being juxtapositionally mounted so that the raised portion of each contacts and slides longitudinally in the recessed portion of the other thus forming a cavity the size of which varies with the relative position of the said members,
   (f) the sliding members further being mounted so that the outermost chamfered surface of one end of one sliding member as well as the outermost longitudinal surface contiguous therewith are each in juxtapositional contact with fixed supporting members,
   (g) a pair of oppositely positioned supporting members mounted in complementary relationship to and in contact with the sliding members in such a manner so as not to interfere with the sliding motion of said members and so as to form an expansible enclosure, each of said sliding and supporting members defining a wall of said enclosure,
   (h) means for providing compressing force to the opposing chamfered surface at the opposite end of the mate of the sliding member referred to in (f),
   (i) auxiliary means to provide supporting force to the corresponding opposing chamfered surface of the same end of the mate of the sliding member referred to in (f).

References Cited by the Examiner

UNITED STATES PATENTS

| | | | |
|---|---|---|---|
| 1,888,429 | 11/1932 | Matson | 18—1 |
| 2,012,905 | 8/1935 | Chace | 18—1 |
| 2,947,034 | 8/1960 | Wertof. | |
| 3,105,974 | 10/1963 | Gerard et al. | |

WILLIAM J. STEPHENSON, *Primary Examiner.*